(12) United States Patent
Bouchat et al.

(10) Patent No.: US 8,509,216 B2
(45) Date of Patent: Aug. 13, 2013

(54) METHOD FOR MANAGEMENT OF COMMUNICATION DEVICES IN AN ACCESS NETWORK AND A RELATED ACCESS UNIT

(75) Inventors: Christele Bouchat, Antwerp (BE); Christian Marie Adelin Hublet, Lochristi (BE)

(73) Assignee: Alcatel Lucent, Paris (FR)

( * ) Notice: Subject to any disclaimer, the term of this patent is extended or adjusted under 35 U.S.C. 154(b) by 876 days.

(21) Appl. No.: 11/091,888

(22) Filed: Mar. 29, 2005

(65) Prior Publication Data

US 2005/0220075 A1   Oct. 6, 2005

(30) Foreign Application Priority Data

Apr. 5, 2004   (EP) .................................... 04290905

(51) Int. Cl.
*H04L 12/66* (2006.01)
(52) U.S. Cl.
USPC ............................ 370/351; 370/431; 370/465
(58) Field of Classification Search
USPC ......... 370/355, 351, 356, 354, 383; 709/228, 709/227
See application file for complete search history.

(56) References Cited

U.S. PATENT DOCUMENTS

| | | | |
|---|---|---|---|
| 6,618,377 B1 * | 9/2003 | Miriyala | 370/395.1 |
| 2002/0065907 A1 | 5/2002 | Arnold et al. | |
| 2002/0103912 A1 * | 8/2002 | Dalgard | 709/227 |
| 2004/0022222 A1 * | 2/2004 | Clisham | 370/338 |
| 2004/0095881 A1 * | 5/2004 | Borella et al. | 370/219 |
| 2004/0205230 A1 * | 10/2004 | Fontana et al. | 709/236 |
| 2004/0240452 A1 * | 12/2004 | Klaghofer et al. | 370/395.21 |
| 2005/0138181 A1 * | 6/2005 | Gallet et al. | 709/228 |
| 2005/0163128 A1 * | 7/2005 | Blackburn | 370/395.21 |
| 2011/0055416 A1 * | 3/2011 | Chen et al. | 709/231 |

FOREIGN PATENT DOCUMENTS

| | | |
|---|---|---|
| EP | 1 389 851 A | 2/2004 |
| WO | WO 02/103547 A | 12/2002 |

* cited by examiner

*Primary Examiner* — Kevin C Harper
*Assistant Examiner* — Henry Baron
(74) *Attorney, Agent, or Firm* — Sughrue Mion PLLC

(57) ABSTRACT

Managing a plurality of Communication devices in an access network by successively establishing a temporary point-to-point layer two connection from a management server to each of the communication devices of the plurality of communication devices during a management phase.

16 Claims, 1 Drawing Sheet

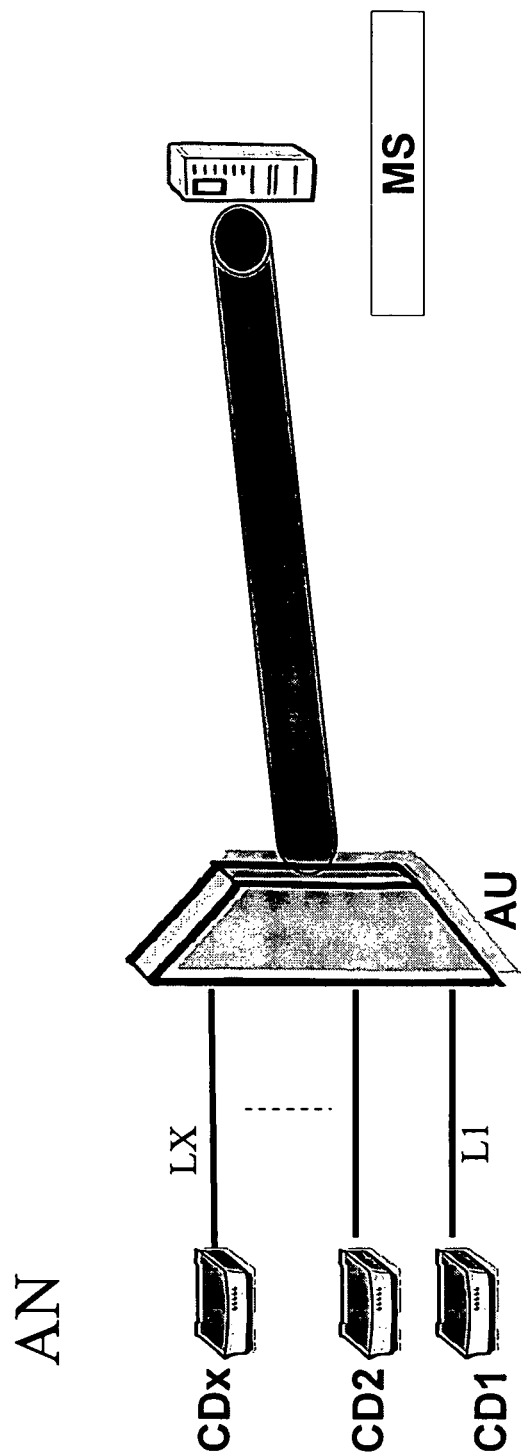

METHOD FOR MANAGEMENT OF COMMUNICATION DEVICES IN AN ACCESS NETWORK AND A RELATED ACCESS UNIT

CROSS-REFERENCE TO RELATED APPLICATION

This application claims priority from European Patent Application No. 04290905.1, filed on Apr. 5, 2004 in the European Patent Office, the entire disclosure of which is incorporated herein by reference in its entirety.

BACKGROUND

1. Field

The present invention relates to a method for management of a plurality of Communication devices in an access network as described in preamble of claim 1 and an access unit as described in the preamble of claim 10.

2. Description of Related Arts

Such management-method and related device are generally known in the art. The management method, for instance configuration, of communications devices in an Internet Protocol network access network is realised using the Internet Protocol layer for provisioning the layer three connection between a management network element such as configuration server and a to be managed device, required for management purposes.

Such a communications network comprises an Access Unit and an Ethernet, ATM or a MPLS aggregation network, wherein the Access Unit, such as a Digital subscriber line access unit, couples the communications device, such as a Digital subscriber line modem, to the aggregation network. The communications device being coupled to the Access Unit over an ATM connection.

This communication required for the management of the communications devices is based on the Internet Protocol address further referred to as IP-address, for addressing the management application at the communications device.

Currently, the communication required for the management of the communications devices is based on Internet Protocol, where the Internet Protocol addresses of the communication devices are unique addresses.

In some situations however, no unique IP-address is assigned to the communications devices (communication devices may have the same IP address) or the communication devices do not have an externally known IP-address. Then it is not possible to use the IP layer for addressing communications devices for management purposes and other purposes.

This situation could occur for example due the lack of public IP addresses, or in a network where the uniqueness of the IP addresses assigned to the communications devices cannot be ensured.

Hence, if there is no unique IP-address available for addressing such communications devices communications devices are not reachable at layer three and not able to be managed.

SUMMARY

An object of the present invention is to provide a management method of a plurality of Communication devices in an access network environment and a related device of the above known type but where no unique IP address is required.

According to the invention, this object is achieved by the method as claimed in claim 1 and the access unit as claimed in claim 10.

Indeed, this object is achieved due to the fact that the access unit, during a communications devices management phase, successively establishes and releases a temporary OSI layer 2 point-to-point connection from the configuration server to each of said communication devices and that the configuration server, at establishment of each such a temporary layer 2 point-to-point connection between the configuration server and the corresponding communication device, manages, for instance configures, the corresponding Communication device of the plurality of communication devices based on a terminal identifier of said corresponding communication device.

An additional advantageous feature of the present invention is that is that no modification on OSI Layer 1 and Layer 2 of the access unit is required, hence not leading to a higher cost and complexity of the access unit.

Another characterizing embodiment of the present invention is described in claim 2.

The temporary point-to-point layer two connection is established over a switched virtual connection if an Asynchronous Transmission method is applied between the access unit and the communication devices.

Another characterizing embodiment of the present invention is described in claim 3.

The temporary point-to-point connection is established over a permanent virtual connection if an Asynchronous Transmission method in the aggregation network is applied between said access unit and the management server.

Another alternative embodiment of the present invention is described in claim 4.

The point-to-point connection is established over a virtual Local area network pipe VLAN if an Ethernet aggregation network is applied between the access unit and the management server.

A further alternative embodiment of the present invention is described in claim 5.

The temporary point-to-point connection is established over a Labeled switched path LSP if a Multi Protocol Label Switching aggregation network is applied between the access unit and the management server.

Another characterizing embodiment of the present invention is described in claim 6.

The Terminal identifier is the MAC address of the communication device

A further alternative embodiment of the present invention is described in claim 7.

The Terminal identifier is the organizational unique identifier.

A further alternative embodiment of the present invention is described in claim 8.

The Terminal identifier may also be an identifier of a group of communications devices such as the vendor-name of the terminal together with the model and the version of the terminal.

Another characterizing embodiment of the present invention is described in claim 9.

The step of successively establishing a temporary point-to-point connection from the management server to each of said communication devices of said plurality of communication devices, is based on management data of said access unit.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein:

FIG. 1 represents a communications network CN such as an access network AN wherein the present invention is implemented.

DETAILED DESCRIPTION

In the following paragraphs, referring to the drawing, an implementation of the method for management of a plurality of Communication devices CD1.CDx in an access network AN according to the present invention will be described. In the first paragraph of this description the main elements of the communications network as presented in FIG. 1 are described. In the second paragraph, all connections between the before mentioned elements and described means are defined. In the succeeding paragraph the actual execution of the method for session establishment is described.

Such an access network AN comprises a large number of communication devices CD1.CDx and a plurality of access units however in order to keep simplicity in this description it is chosen to present only one access unit UA. In this embodiment a Digital Subscriber Line Access Multiplexer is chosen although also any other access unit could have been chosen.

Furthermore there is a management server for managing the communications devices. This management server MS is in this embodiment chosen to be a configuration server but could also be any IP device trying to establish a layer three connection with the communication device.

Each of the communication devices are coupled to an access unit UA over an ATM connection L1, L2, Lx although this might have been any other layer two connection such as Ethernet or MPLS.

The configuration server MS is coupled to the access unit AU over an ATM, Ethernet or MPLS aggregation network.

In order to explain the working of the present invention it is supposed that each of the communications devices are not assigned a unique IP-address, although the invention works in case all communication device have a unique public IP address. It is further assumed that at a certain moment in time the communications terminals need to be managed, such as for instance configuring the communication devices at first operation.

In the case of customer premises management over IP the access Unit AU successively establishes an IP-connection between the configuration server MS and the communication devices coupled to the Access Unit AU. However, the establishment of the IP-connection is not possible as no unique public IP address is assigned to the terminals.

Instead the Access Unit AU, during a communications devices management phase, successively establishes and releases a temporary point-to-point layer two connection from the access unit AU to each of the communication devices. This temporary point-to-point layer two connection being cross-connect to a permanent layer two connection between the access unit and the configuartion server (CS). The configuration server MS, at establishment of each said temporary point-to-point layer two connection between the configuration server MS and a corresponding communication device of said plurality of communication devices CD1 . . . CDx, configures the corresponding Communication device CD1 here for using the terminal identifier of the corresponding communication device CD1. After the configuration of communications device CD1 the established temporary point-to point layer two connection is released. Subsequently the Access Unit establishes a temporary point-to-point layer two connection between the configuration server MS and communication device CD2 which is followed by the configuration of communications device CD2 by the configuration server MS. At termination of the configuration the temporary point-to-point layer two connection between the configuration server MS and communication device CD2 is released. Successively this is executed for each of the communication devices to be managed.

It is to be noted that the temporary point-to-point layer two connection may be established over a switched virtual connection if an Asynchronous Transmission method is applied between the access unit and the communication devices.

It is further to be noted that the temporary point-to-point connection may be established over a permanent virtual connection if an Asynchronous Transmission method in the aggregation network is applied between said access unit and the management server or the point-to-point connection may be established over a virtual Local area network pipe VLAN if an Ethernet aggregation network is applied between the access unit and the management server or the temporary point-to-point connection may be established over a Labeled switched path LSP if an Multi Protocol Label Switching aggregation network is applied between the access unit and the management server.

It is also to be noted that the step of successively establishing a temporary point-to-point connection from the management server to each of said communication devices of said plurality of communication devices, is based on management data of said access unit.

The terminal identifier may be the MAC address of the terminal, or any other unique identifier of the communication device such as the organizational unique identifier (OUI).

The Terminal identifier may also be an identifier of a group of communications devices such as the vendor-name of the terminal together with the model and the version of the terminal.

It is to be remarked that this invention may be applied in an XDSL network where the Communications devices are bridged or routed modems and the access unit UA is implemented as a Digital Subscriber line Access multiplexer. The Links L1, L2, . . . Lx are ATM connections and the Digital Subscriber line Access multiplexer is coupled to the configuration server over an Ethernet or ATM aggregation network.

The present invention may also be applied in a mobile network, a cable-network or even a fiber network.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for management of a plurality of communication devices in an access network, each communication device of said plurality of communication devices being coupled to a management server via an access unit, wherein said method comprises:
said access unit, during a communications devices management phase, if said access unit is unable to establish a layer three Internet Protocol (IP) connection between said management server and said communication devices, successively establishing a point-to-point connection from said management server to each of said communication devices of said plurality of communication devices; and
said management server, at establishment of each said point-to-point connections between said management server and a corresponding communication device of said plurality of communication devices, managing configuring said corresponding communication device of said plurality of communication devices based on a terminal identifier of said corresponding communication device,
wherein the point-to-point connection is a layer two connection.

2. The method according to claim 1, wherein the point-to-point connection is established over a switched virtual connection if an asynchronous transmission method is applied between said access unit and said communication devices.

3. The method according to claim 1, wherein said point-to-point connection is established over a permanent virtual connection if an asynchronous transmission method in an aggregation network is applied between said access unit and said management server.

4. The method according to claim 1, wherein said point-to-point connection is established over a virtual local area network pipe if an Ethernet aggregation network is applied between said access unit and said management server.

5. The method according to claim 1, wherein said point-to-point connection is established over a labeled switched path if a multi protocol label switching aggregation network is applied between said access unit and said management server.

6. The method according to claim 1, wherein said terminal identifier is the MAC address of the communication device.

7. The method according to claim 1, wherein said terminal identifier is the organizational unique identifier.

8. The method according to claim 1, wherein said terminal identifier is an identifier of a group of communications devices.

9. The method according to claim 1, wherein said successively establishing a point-to-point connection from said management server to each of said communication devices of said plurality of communication devices is based on management data of said access unit.

10. An access unit for management of a plurality of communication devices in a access network, each communication device of said plurality of communication devices being coupled to a configuration server via said access unit, wherein said access unit comprises:
a connecting part which, if said connecting part is unable to establish a layer three Internet Protocol (IP) connection between said management server and said communication devices, successively establishes a point-to-point connection from said management server to each of said communication devices of said plurality of communication devices during a communications devices management phase,
wherein the point-to-point connection is a layer two connection.

11. The method according to claim 1, wherein at establishment of each said point-to-point connection between said management server and a corresponding communication device of said plurality of communication devices, the corresponding communication device is not assigned an Internet Protocol (IP) address.

12. The access unit according to claim 10, wherein each of said communication devices of said plurality of communication devices during the communications devices management phase is not assigned an Internet Protocol (IP) address.

13. The method according to claim 1, wherein each of said communication devices of said plurality of communication devices is a digital subscriber line (DSL) modem.

14. The method according to claim 13, wherein the access unit is a DSL access unit.

15. The access unit according to claim 10, wherein each of said communication devices of said plurality of communication devices is a digital subscriber line (DSL) modem.

16. The access unit according to claim 15, wherein the access unit is a DSL access unit.

* * * * *